(12) United States Patent
Liu et al.

(10) Patent No.: US 7,748,439 B2
(45) Date of Patent: Jul. 6, 2010

(54) HEAT EXTRACTOR FOR MAGNETIC READER-WRITER

(75) Inventors: Kowang Liu, Fremont, CA (US); Daniel G. Abels, San Francisco, CA (US)

(73) Assignee: Headway Technologies, Inc., Milpitas, CA (US)

( * ) Notice: Subject to any disclaimer, the term of this patent is extended or adjusted under 35 U.S.C. 154(b) by 619 days.

(21) Appl. No.: 10/823,098

(22) Filed: Apr. 13, 2004

(65) Prior Publication Data

US 2005/0225897 A1    Oct. 13, 2005

(51) Int. Cl.
F28F 7/00    (2006.01)

(52) U.S. Cl. .............. 165/185; 29/603.07; 360/313; 360/317

(58) Field of Classification Search .......... 165/185; 977/934; 428/209, 815.2; 29/603.07; 360/126, 360/313, 317, 123.11, 125.41, 125.43
See application file for complete search history.

(56) References Cited

U.S. PATENT DOCUMENTS

| | | | | |
|---|---|---|---|---|
| 6,060,150 A * | 5/2000 | Nakatani et al. | ............ | 165/185 |
| 6,181,514 B1 | 1/2001 | Santini et al. | ............... | 360/126 |
| 6,190,764 B1 * | 2/2001 | Shi et al. | ................. | 428/815.2 |
| 6,221,218 B1 * | 4/2001 | Shi et al. | ................. | 204/192.2 |
| 6,381,094 B1 | 4/2002 | Gill | ............ | 360/126 |
| 6,396,660 B1 * | 5/2002 | Jensen et al. | ............... | 360/126 |
| 6,433,968 B1 * | 8/2002 | Shi et al. | .................... | 360/317 |
| 6,466,402 B1 * | 10/2002 | Crue et al. | .................. | 360/126 |
| 6,466,404 B1 | 10/2002 | Crue, Jr. et al. | ............. | 360/126 |
| 6,859,343 B1 * | 2/2005 | Alfoqaha et al. | ............ | 360/126 |
| 6,894,877 B1 * | 5/2005 | Crue et al. | .................. | 360/313 |
| 6,934,154 B2 * | 8/2005 | Prasher et al. | .............. | 165/185 |
| 6,940,693 B2 * | 9/2005 | Lille et al. | ................... | 360/126 |
| 6,949,200 B2 * | 9/2005 | Fontana et al. | ........... | 29/603.07 |
| 6,975,486 B2 * | 12/2005 | Chen et al. | ................... | 360/126 |
| 6,989,964 B2 * | 1/2006 | Hsu et al. | .............. | 360/125.43 |
| 7,007,372 B1 * | 3/2006 | Chen et al. | ............... | 29/603.07 |
| 7,038,880 B2 * | 5/2006 | Han et al. | .............. | 360/123.41 |
| 7,054,113 B1 * | 5/2006 | Seagle et al. | ................. | 360/317 |
| 7,063,127 B2 * | 6/2006 | Gelorme et al. | ............. | 165/185 |
| 7,079,354 B1 * | 7/2006 | Fontana et al. | .............. | 360/126 |
| 7,147,041 B2 * | 12/2006 | Mitchell et al. | ............. | 165/185 |

OTHER PUBLICATIONS

Definitions for "pedestal", The Free Dictionary, by Farlex [online]. [Retrieved on Aug. 24, 2008]. Retrieved from the Internet: <URL: http://www.thefreedictionary.com/pedestal>.*

Definitions for "substrate", The Free Dictionary, by Farlex [online]. [Retrieved on Aug. 24, 2008]. Retrieved from the Internet: <URL: http://www.thefreedictionary.com/substrate>.*

"Thermal Conductivity of AlN and SiC Thin Films," by Sun Rock Choi et al., International Journal of Thermophysics, ISSN 0195-928X, 2006, vol. 27, No. 3. pp. 896-905, Springer, New York, NY.

(Continued)

*Primary Examiner*—Ljiljana (Lil) V Ciric
(74) *Attorney, Agent, or Firm*—Saile Ackerman LLC; Stephen B. Ackerman

(57) ABSTRACT

A heat extractor to transfer heat generated by the coil of a magnetic read head to a substrate, when there is at least one thermally insulating layer between the coil and the substrate, is disclosed, together with a method for its manufacture.

11 Claims, 4 Drawing Sheets

OTHER PUBLICATIONS

"Measurement of the thermal conductivity of TiO2 thin films by using the thermo-reflectance method," by Jungho Mun et al., ScienceDirect—Thermochimica Acta, vol. 455, Issues 1-2, Apr. 1, 2007, http://www.sciencedirect.com/science?_ob=ArticleURL&_udi=B6THV-4 . . . .

"Thermal conductivity measurements on thin films based on micromechanical devices," by E. Jansen et al., Journal of Micromechanics and Microengineering, vol. 6, 1996, http://www.iop.org/EJ/abstract/0960-1317/6/1/029.

"Electrical properties," and "Thermal conductivity," p. 5 of 9, found: http://en.wikipedia.org/wiki/Material_properties_of_diamond#Thermal_conductivity, Material properties of diamond—Wikipedia, the free encyclopedia, Jan. 18, 2009.

* cited by examiner

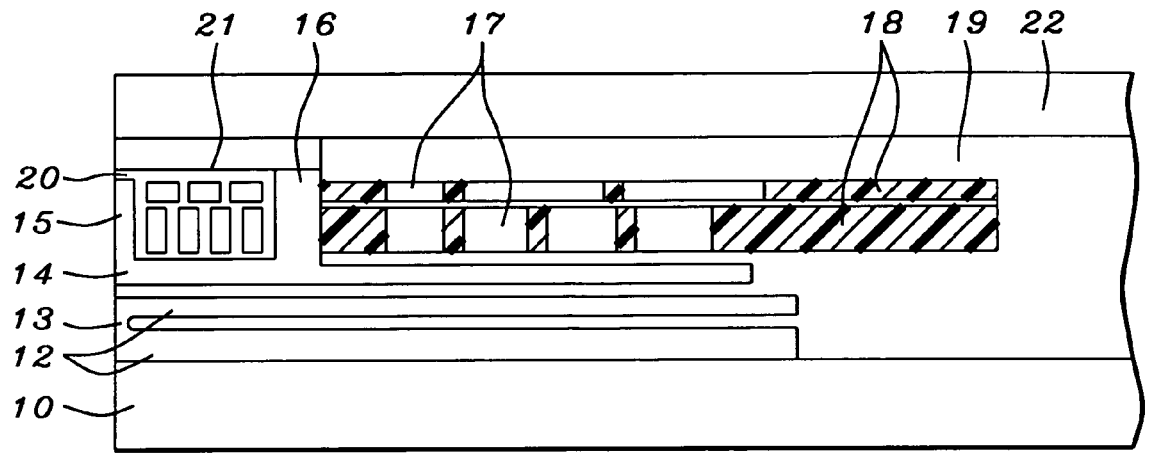
FIG. 1 - Prior Art
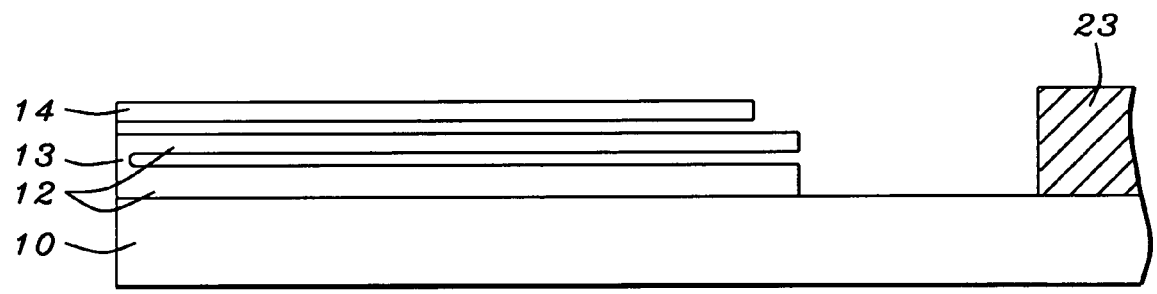
FIG. 2
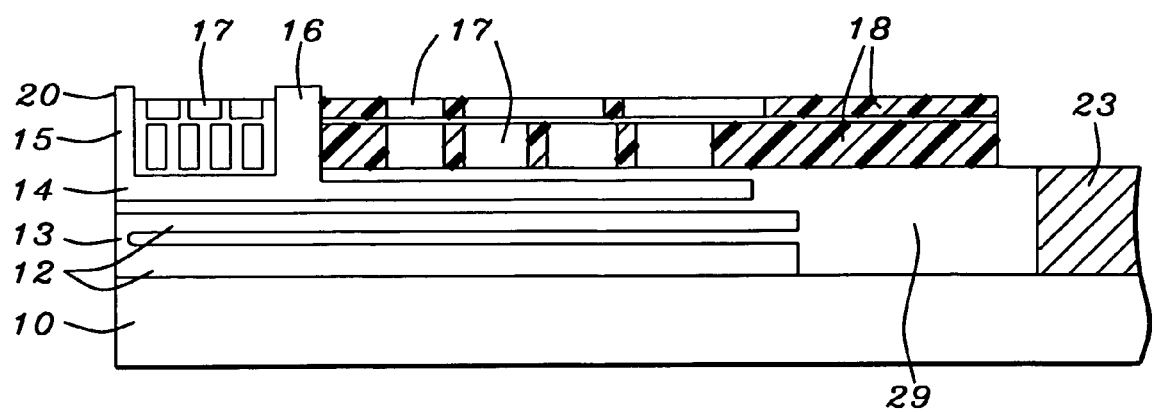
FIG. 3

HEAT EXTRACTOR FOR MAGNETIC READER-WRITER

FIELD OF THE INVENTION

The invention relates to the general field of magnetic read-write heads with particular reference to dissipating heat generated by the write coil.

BACKGROUND OF THE INVENTION

FIG. 1 shows a cross-sectional view of a read-write head of the prior art. Seen there are substrate 10 on which is undercoat 11. Magnetic read unit 13 is seen sandwiched between reader shields 12. The read unit is a magneto-resistive type such as a GMR (giant magneto-resistance) or MTJ (magnetic tunnel junction).

Directly above the upper of the two shields 12 is horizontal portion 14 of the bottom pole from which vertical portion 15 extends, its outer edge being part of the ABS (air bearing surface). Some distance away from vertical bottom pole 15 is yoke 16 that also extends upwards from the horizontal bottom pole, but to a slightly greater height than the vertical lower pole. Non-magnetic write gap layer 20 lies on vertical pole 15 and extends from the ABS to the edge of yoke 16.

Surrounding yoke 16 is coil(s) 17, the number of coils being a design choice which will be discussed in greater detail below. Hard-baked photoresist 18 is used to encapsulate the coil(s) as well as the yoke. The writer magnetic circuit is completed through top pole 21 which is in magnetic contact with yoke 16 and is separated from vertical pole 15 by write gap layer 20. The structure of FIG. 1 is completed by filler insulation 19 and by overcoat layer 22.

As areal density requirements have become more stringent for magnetic recording read/write heads, the complexity of the writer structure design has grown significantly. The need for a higher number of coil turns in the writer for stronger overwrite magnetic field, while minimizing the coil DC resistance, result in a trend to multi-layer coil writer structures. The frequency extendability requirement for higher data rate applications dictates the need for a shorter yoke length and the associated lower inductance, which also necessitates a multi-coil layer writer structure. While this achieves the required magnetic performance, the multi-layer coil writer has an intrinsic deficiency—poor heat dissipation for the upper (top) layer coils. Higher thermal pole tip protrusion during writer activation resulting from this drawback creates reliability problems relative to single-layer coil writer designs.

A routine search of the prior art was performed with the following references of interest being found:

In U.S. Pat. No. 6,181,514, Santini et al. disclose a non-organic insulating material on the coil as a heat dissipater. In U.S. Pat. No. 6,466,404, Crue, Jr. et al. show AlN or other material as an undercoat under the coil to dissipate heat and, in U.S. Pat. No. 6,381,094, Gill teaches using gold and tantalum as a heat sink layer.

SUMMARY OF THE INVENTION

It has been an object of at least one embodiment of the present invention to provide a magnetic read-write head that exhibits little or no protrusion, due to thermal expansion, of the vertical write pole during operation of the device.

Another object of at least one embodiment of the present invention has been to achieve said reduced thermal pole protrusion through the provision of improved cooling of the write coils.

Still another object of at least one embodiment of the present invention has been to provide a process for the manufacture of said improved read write-head.

These objects have been achieved by including a heat diffuser on top of the return portion of the upper coils together with a pedestal that connects it to the substrate. During writer activation, the joule heating generated by the write current at the coils is extracted through the heat diffuser and subsequently dissipated in the substrate. The resulting lower temperature rise in the pole tip area leads to lower thermal strain/stress and induced protrusion.

BRIEF DESCRIPTION OF THE DRAWINGS

FIG. 1 illustrates a typical prior art planar read-write magnetic head.

FIG. 2 shows the starting point for the process of the present invention.

FIGS. 3 and 4 show intermediate steps in the process of the present invention.

DESCRIPTION OF THE PREFERRED EMBODIMENTS

Figure 4:
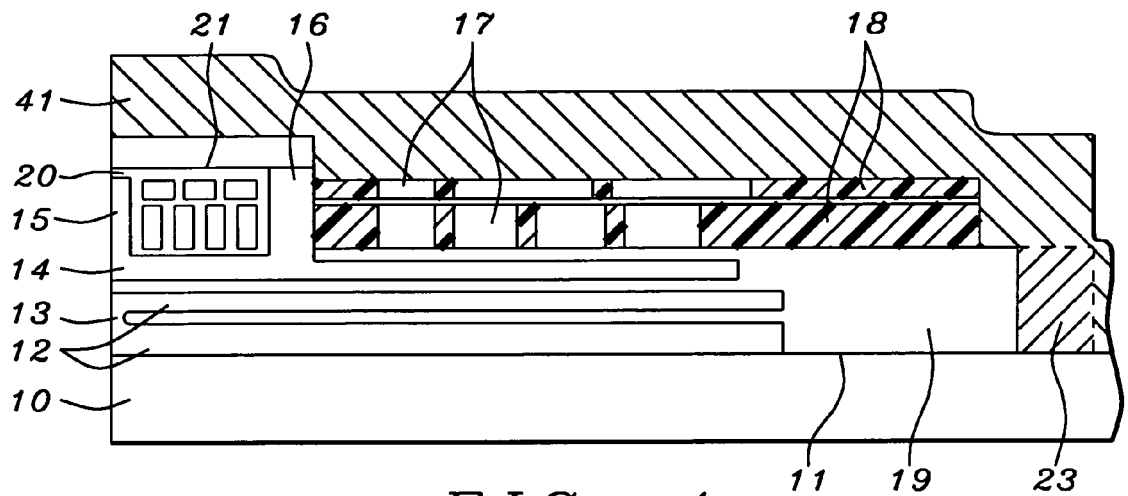

We now disclose a structure having a heat extractor to dissipate the coil heat generation through an alternative path inside the slider for improved current driven thermal pole tip protrusion. The preferred embodiment uses a combination of heat diffuser and pedestal for heat sinking to the slider substrate. This heat extractor extracts and dissipates the heat generated during writer activation in multiple coil layer writer structures to reduce the thermal pole tip protrusion.

To remedy the undesirable problem of higher thermal pole tip protrusion, a novel heat extractor structure has been designed to enhance the heat dissipation of the top layer coils to the slider substrate. This invented heat extractor structure is applicable to other multi-layer coil writer structures such as nine-turn double planar writer with 12 micron yoke length, stitched-pole writer, perpendicular writer, etc. This heat extractor is also compatible with various reader shield structures. In fact, for smaller shield sizes, the conductive pedestal (see below) can be made larger for even better heat sinking effect.

The heat extractor consists of a heat diffuser on top of the return portion of the upper coils and a pedestal connecting the diffuser to the undercoat. During writer activation, the joule heating generated by the write current at the coils can be extracted through the heat diffuser and subsequently dissipated onto the substrate through the pedestal. This alternative heat sink path alleviates the "heat dwelling" problem of the existing two layer coil writer at the interface of the upper and lower coils, thus reducing the temperature rise in the coil and device area. Lower temperature rise in the pole tip area leads to lower thermal strain/stress and induced protrusion.

The material for the heat diffuser and pedestal is constrained to be non-magnetic and should have high thermal conductivity. Copper is a good candidate due to its superior thermal conductivity and its easiness for plating process integration, but other materials such as tungsten and molybdenum (which have lower coefficients of thermal expansion) as well as silicon, ruthenium, rhodium, iridium, and their mutual alloys, could be substituted. Since the extractor structure is encapsulated within the slider body, material corrosion during backend processing is not a concern. Also, the extractor is further recessed away from the ABS surface so the isothermal protrusion associated with volumetric expansion of materials with higher coefficient of thermal expansion (CTE) is lessened. Therefore, the material selection possibilities for higher CTE materials are increased.

The heat diffuser and pedestal should be as wide as space permits (typically between about 1 and 2.5 microns thick and between about 100 and 125 microns wide for the extractor layer and a cross-sectional area of at least 10,000 sq. microns for the pedestal) for improved heat dissipation, following the principle of larger surface area to volume ratio in thermal design. The diffuser should cover the area of the hard-baked photo resist for more effective cooling since the thermal conductivity of photo resist is extremely poor. The insulator separating the yoke diffuser and coil-diffuser is also preferred to be thin (in range of between about 2,000 and 8,000 Angstroms).

Referring now to FIG. 2, the process to manufacture the invention begins with substrate 10 onto which is deposited undercoat 11. Magnetic read head 13, sandwiched between upper and lower magnetic shield layers 12, is then formed on said undercoat. With read head assembly 13 in place, bottom horizontal magnetic pole 14 is formed on upper magnetic shield 12, following which thermally conductive pedestal 23 (that does not contact bottom horizontal magnetic pole 14) is formed on undercoat 11, giving the structure the appearance shown in FIG. 2.

Next, as seen in FIG. 3, layer of insulation 19 is deposited on all exposed surfaces followed by planarization down to the level of bottom horizontal magnetic pole 14. Then, vertical bottom magnetic pole 15 is formed, its front surface being part of the ABS, along with magnetic yoke 16 that extends upwards from the bottom horizontal pole to a slightly greater height than vertical bottom pole.

Write coil 17 (which may have one or more turns) is then formed. It surrounds yoke 16 and rests on bottom horizontal magnetic pole 14, though it is insulated therefrom. This is followed by the deposition of photoresist 18, in an amount that is sufficient to fully cover, and thereby electrically insulate, write coil 17. Photoresist 18 is now patterned so that it covers all exposed surfaces except for pedestal 23 and this photoresist is then hard baked. An insulating layer is then deposited onto the patterned write coil and photoresist, covering all exposed surfaces except pedestal 23 and magnetic yoke 16.

Moving next to FIG. 4, layer of non-magnetic material 20, that extends from over bottom vertical pole 15 as far as the outer edge of yoke 16, is then deposited and patterned so as to form write gap 20. Top magnetic pole 21 is then formed, extending from the ABS as far as, and making magnetic contact with, yoke 16. Then, in a key feature of the invention, layer of thermally conductive material 41 is deposited on all exposed surfaces.

Figure 5:
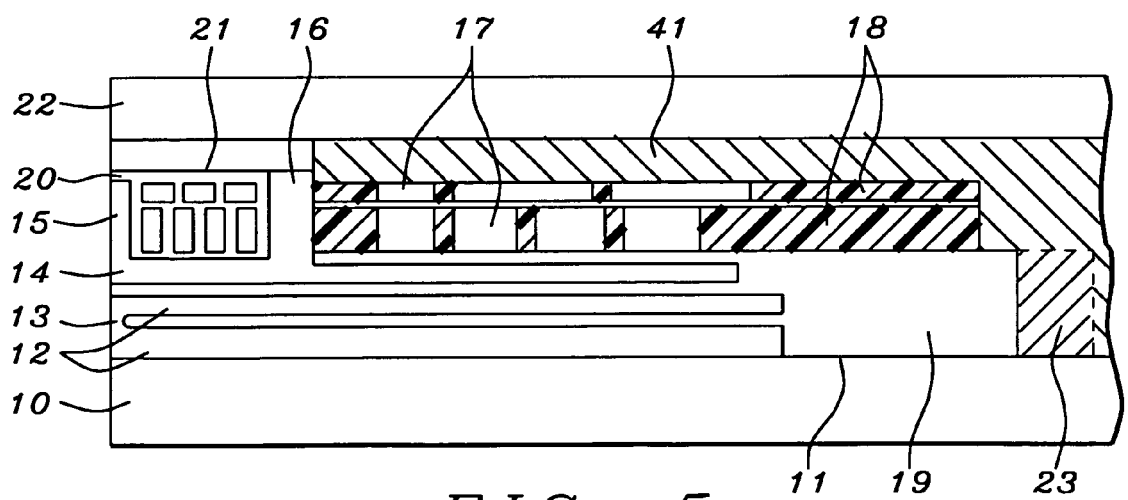
FIG. 5 shows the final structure that results from a first embodiment of the process of the present invention.

Finally, as can be seen in FIG. 5, the structure is then planarized until top magnetic pole 21 is just exposed, thereby forming heat diffuser 41 that, together with thermally conductive pedestal 23, provides a thermal path between the write coil(s) and the undercoat/substrate. The presence of this thermal path serves to reduce, or eliminate, protrusion, due to thermal expansion, of the vertical write pole during operation of the device.

Formation of the device concludes with the deposition of overcoat layer 22 onto all exposed surfaces.

Figure 6:
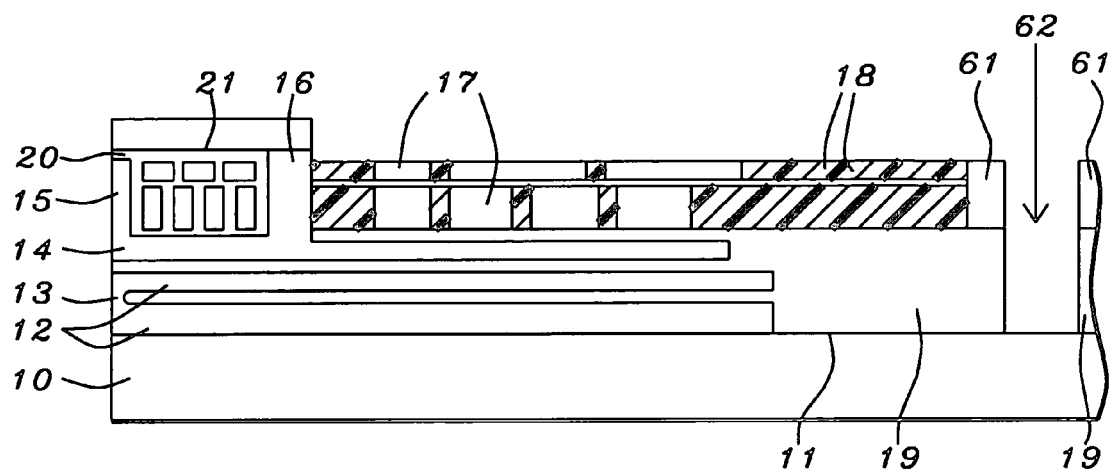
FIGS. 6 and 7 show steps in a second embodiment of the process of the present invention.

A second embodiment of the invention is manufactured in a similar manner to that detailed above to the point where the structure is as seen in FIG. 2, but without the formation of pedestal 23. Instead, as illustrated in FIG. 6, first layer of insulation 19 is deposited onto all exposed surfaces and then planarized down to the level of bottom horizontal magnetic pole 14.

Then, vertical bottom magnetic pole 15 is formed, as before, along with magnetic yoke 16 followed by the formation of write coil(s) 17 that surrounds yoke 16. Next, photoresist 18, sufficient to fully cover the coils, is deposited thereby electrically insulating them. Photoresist 18 is now patterned so as to leave uncovered that portion of first insulation layer 19 that overlies only the substrate.

After the photoresist has been hard baked, layer of non-magnetic material 20, that extends from over the vertical bottom pole as far as the yoke, is deposited to form the write gap. Second layer of insulating material 61 is then deposited and planarized until write gap layer 20 is just exposed and via hole 62, that extends as far as the undercoat, is formed.

Figure 7:
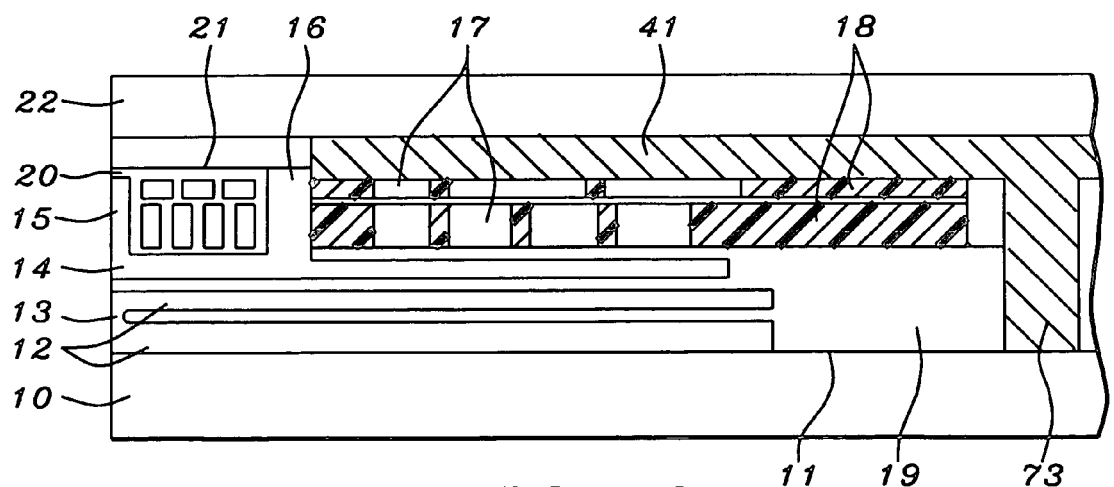

Moving on to FIG. 7, via hole 73 is overfilled with thermally conductive material and the structure is planarized until top magnetic pole 21 is just exposed. As in the first embodiment, the completed structure features heat diffuser 41 that, together with the filled via hole, provides a thermal path between the write coil(s) and the undercoat, whereby pole protrusion due to thermal expansion is reduced. The process concludes with the deposition of overcoat 22 onto all exposed surfaces, giving the completed structure the appearance illustrated in FIG. 7.

Confirmation of the Effectiveness of the Invention

To verify the ability of this heat extractor structure to reduce thermal pole tip protrusion during writer activation, a finite-element model (FEM) was created for simulation under steady-state conditions for the planar writer shown in FIGS. 5 and 7. The material selected for diffuser and pedestal in the simulation was copper. The layout in the simulation of the diffuser was 43 μm depth by 66 μm width and, for the pedestal, 42 μm depth by 100 μm width. The distance between the back of the yoke and the front of diffuser in the model was 3 μm. The spacing between the top coil surface and the bottom of the diffuser was 0.2 and 0.6 μm respectively.

The simulation results for PTP (pole tip protrusion), based on 40 mA DC writer current and 2.91 ohm coil DCR (direct current resistance) in the disk-flying and non-flying conditions are tabulated in TABLE I below:

TABLE I

| Configuration | Non-flying PTP | Improvement | Flying PTP | Improvement |
|---|---|---|---|---|
| Prior art device | 2.42 nm | — | 1.55 nm | — |
| 0.6 μm extractor spacing | 2.04 nm | 16% | 1.33 nm | 14% |
| 0.2 μm extractor spacing | 1.88 nm | 22% | 1.27 nm | 19% |

Figure 8:
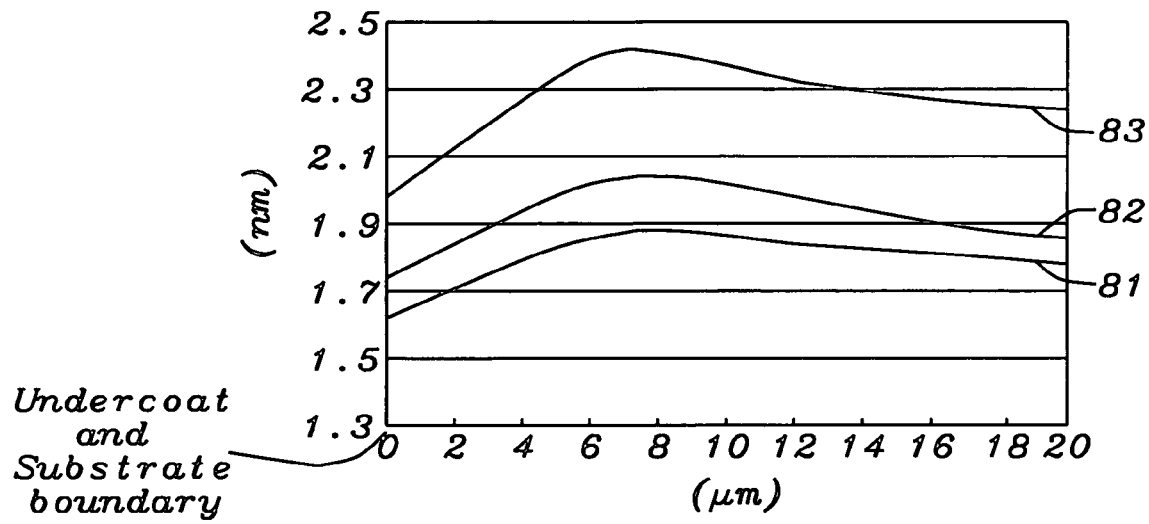
FIGS. 8 and 9 show the results of a simulation of the performance of the invention.

The protrusion calculation is referenced at the entire slider's leading edge. The above result indicates that the heat extractor improves the maximum protrusion during writer activation ranging from 16% to 22% under non-flying condition and 14% to 19% under disk flying conditions. An example of the protrusion profile comparison under non-flying condition among the 3 simulated configurations is shown in FIG. 8. Curve 81 is for the 0.6 micron extractor, curve 82 is for the 0.2 micron extractor, and curve 83 is for the prior art device. The effectiveness can be further improved with larger areas for diffuser and pedestal compared to the exemplary configurations used in the simulation.

Figure 9:
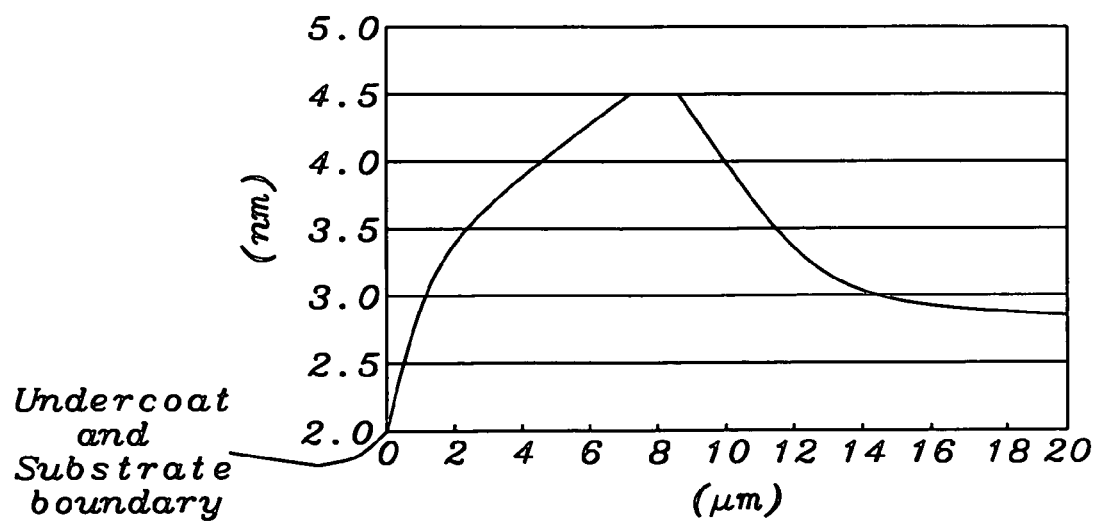

The added heat extractor structure was also verified with FEM simulation to evaluate its isothermal protrusion performance. The simulation results based on 40° C. ambient temperature rise are shown in FIG. 9.

The isothermal protrusion profiles for slider with and without the heat extractor are almost identical (<1% difference). This shows that the addition of heat extractor structure does not degrade the isothermal protrusion performance. The result distinguishes this heat extractor design from other heat sink/diffuser proposals that exhibit significant isothermal protrusion increase due to the location being too close or even exposed to the ABS surface.

We conclude by noting that the simulation results reported above do not necessarily represent the best possible improvements obtainable with the invention. For example, heat dissipation could be further improved by substituting aluminum nitride as the insulation in place of the aluminum oxide that is normally used.

What is claimed is:

1. A method to conduct heat generated by a coil located within a structure, to a single substrate, wherein there is at least one thermally insulating layer between said coil and said substrate, comprising:
    forming a thermally conductive pedestal that originates at said substrate, and extends upwards therefrom;
    forming a layer of thermally conductive material that overlies said coil and extends beyond said coil to overlie said pedestal; and
    thermally connecting said coil to said substrate through said pedestal, thereby providing an unbroken thermal path between said coil and said substrate.

2. The method of claim 1 wherein said layer of thermally conductive material and said conductive pedestal have a thermal conductivity between 100 and 400 W/m.K.

3. The method of claim 1 wherein said layer of thermally conductive material is selected from the group consisting of copper, tungsten, molybdenum, silicon, ruthenium, rhodium, and iridium.

4. The method of claim 1 wherein said layer of thermally conductive material has a thickness between 1 and 2.5 microns.

5. The method of claim 1 wherein said pedestal has a cross-sectional area that is between 10,000 and 15,000 sq. microns.

6. The method of claim 1 wherein said coil generates heat at a rate between 4 and 15 milliwatts.

7. A heat extractor for a structure that includes a coil, a single substrate, and at least one thermally insulating layer between said coil and said substrate, comprising:
    a thermally conductive pedestal that originates at said substrate and extends upwards therefrom;
    a layer of thermally conductive material that that overlies said coil and extends beyond said coil to overlie said pedestal; and
    a thermal connection between said pedestal and said coil, whereby there is an unbroken thermal path between said coil and said substrate.

8. The heat extractor described in claim 7 wherein said layer of thermally conductive material and said conductive pedestal have a thermal conductivity between 100 and 400 W/m.K.

9. The heat extractor described in claim 7 wherein said layer of thermally conductive material is selected from the group consisting of copper, tungsten, molybdenum, silicon, ruthenium, rhodium, and iridium.

10. The heat extractor described in claim 7 wherein said layer of thermally conductive material has a thickness between 1 and 2.5 microns.

11. The heat extractor described in claim 7 wherein said pedestal has a cross-sectional area that is between 10,000 and 15,000 sq. microns.

* * * * *